United States Patent Office 3,445,151
Patented May 20, 1969

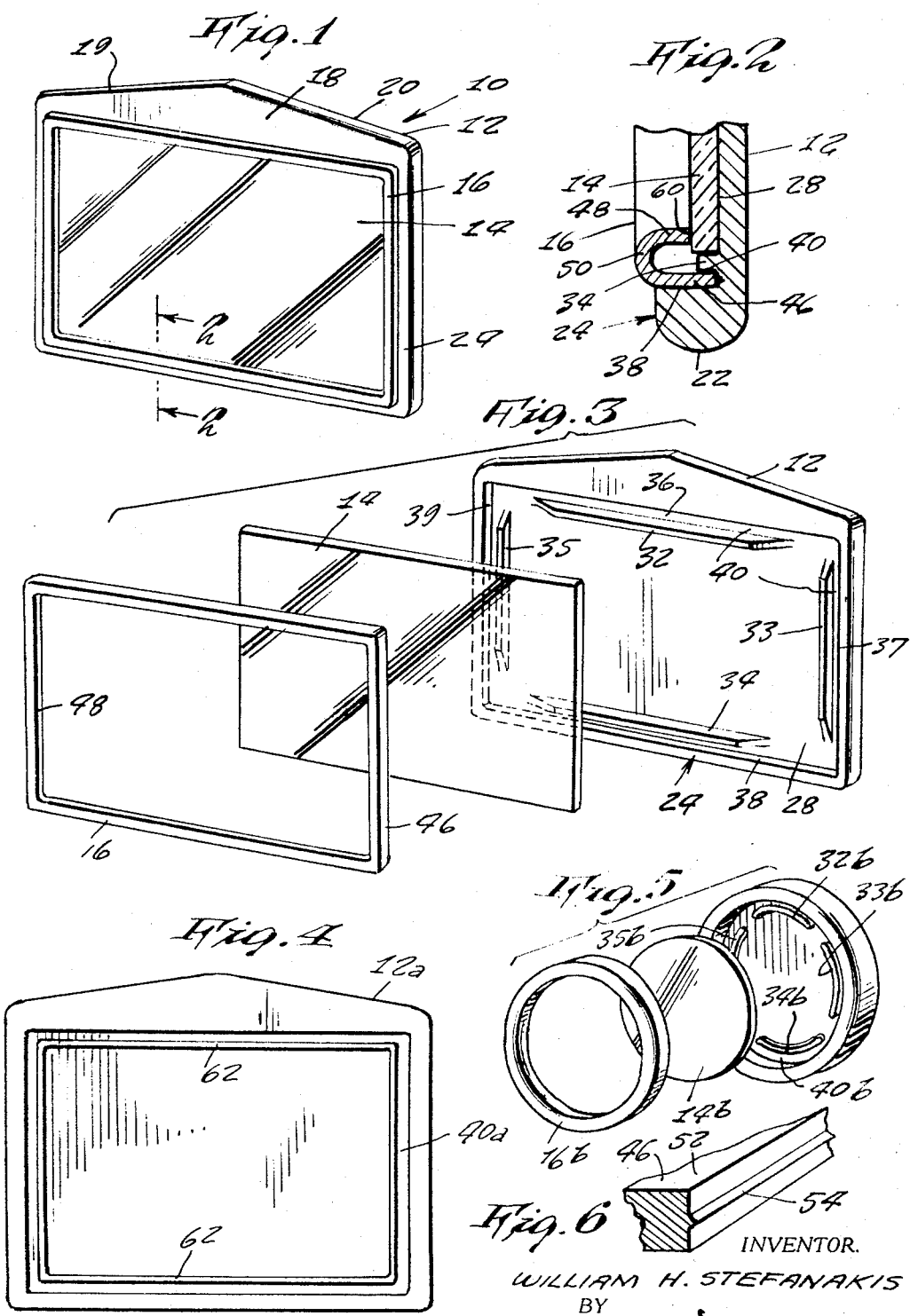

3,445,151
MIRROR ASSEMBLY WITH SEAL TIGHT
CONSTRUCTION
William H. Stefanakis, % Sealtite Mirror Mfg. Co., 3914
Long Beach Road, Island Park, N.Y. 11558
Filed Nov. 2, 1967, Ser. No. 680,186
Int. Cl. G02b 7/18, 5/08
U.S. Cl. 350—67　　　　　　　　　　　　　　　1 Claim

ABSTRACT OF THE DISCLOSURE

A mirror assembly having a back panel with uniformly spaced ribs thereon, and forming a channel therebetween wherein a sealing bezel element is located in said channel providing a complete and positive seal between said back and mirror.

---

This invention relates to small mirrors of the type carried by women in their hand bags.

The primary object of this invention is to provide a mirror construction embodying a back panel having a perimetral frame provided with upstanding positioning ribs to hold a mirror therebetween. The ribs defining along with the perimetral frame a channel for the reception of a bezel element to be permanently secured to the panel so as to effect a seal tight attachment of the mirror to the panel.

Another object of this invention is to form the bezel element U-shaped in cross-section with one arm abutting an edge portion of the mirror and with the other arm fitted into the channel for securement therein.

A further object of this invention is to form on the terminal edge of the bezel element arm to be fitted into the channel, a minute V-shaped bead that will facilitate the heat or solution sealing of the arm to the panel.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGURE 1 is a perspective view of the mirror.

FIGURE 2 is a detail cross-sectional view taken on line 2—2, FIGURE 1.

FIGURE 3 is an exploded view of the parts of the mirror.

FIGURE 4 is a front view of a modified form of back panel with a continuous rib.

FIGURE 5 is an exploded view of the parts of a modified shape of mirror.

FIGURE 6 is a fragmentary perspective view of one arm of the bezel element showing the minute bead on its terminal end.

Referring in detail to the drawings, the complete mirror 10 is seen to consist of a back panel 12, a mirror element 14 and a bezel element 16 which secures the mirror element to the back panel. The back panel 12 is formed of a suitable plastic material which may or may not be transparent. The back panel 12 is substantially rectangular in form with its upper side 18 formed triangular in shape as defined by the inclined edges 19, 20. Preferably the entire perimetral edge of the back frame 12 is rounded as at 22, as seen in FIGURE 2. The front face of the back panel 12 is recessed such that there extends at all four sides of the back panel a rectangular frame 24 that is uniformly narrow except for the upper triangular side 18. The frame 24 is of a height or depth that is substantially greater than the thickness of the glass mirror element 14 to be housed therein, see FIGURE 2.

The front wall surface 28 of the back panel 12 constitutes the bottom of the recess 30 and is provided with separate upstanding ribs 32, 33, 34, 35 parallel respectively, to the frame sides 36, 37, 38 and 39, see FIGURE 3. Between each rib and its opposed frame side there is formed a channel 40. It is to be noted, as seen in FIGURE 2, that the rib 34 is of a height substantially equal to the thickness of the glass mirror element 14, and that the other ribs are of the same corresponding height. The length and width of the glass mirror element 14 is such that the same will freely fit between the ribs with a minimum of clearance. It is thus seen that the ribs serve not only to center and position the mirror element 14 within the frame 24 and on the back panel 12, but also to hold the same in this position. Also as seen in FIGURE 2, the back surface of the mirror element 14 is in complete contact with the front wall surface 28 of the back panel 12.

To permanently lock the mirror element 14 to the back panel 12 in a complete seal tight relationship there is utilized the bezel element 16. The bezel element 16 is formed of the same plastic material as that of the back panel in the shape of a rectangular frame, see FIGURE 3, and is seen to be U-shaped in cross-section, see FIGURE 2, to provide an outer rectangular long arm 46 and an inner parallel rectangular short arm 48 joined by an arcuate bight portion 50. Provided on the free terminal edge 52 of the long arm 46 of the bezel element 16 is a centrally disposed longitudinal minute preferably V-shaped bead 54 that extends continuously on all four sides of the long arm.

With the mirror element 14 seated within ribs 32, 33, 34 and 35, the bezel element 16 is applied to the back panel 12 by inserting the long arm 46 into the channel 40 such that the V-bead 54 will engage the bottom of the channel. At the same time, it is to be noted that the terminal edge 60 of the short arm 48 will pressure engage the outer face of the mirror element 14, adjacent the edges thereof, as seen in FIGURE 2. Permanent securement of the bezel element is effected by a heat sealing process wherein by virtue of the minute V-bead 54 a quick and positive weld is effected between the terminal end 52 of the long arm 46 and the bottom of the channel 40. In lieu of heat sealing the joining of the terminal end 52 to the bottom of the channel 40 may be effected by use of a solution sealing composition. It is thus seen that the bezel element, joined to the back panel in the manner described above will provide a positive permanent locking of the mirror element 14 thereto, but will also provide by virtue of its U-arm construction a complete and positive seal or cover around the edges of the mirror element.

My invention also contemplates the placing (not shown) of a picture, advertising sheet or other indicia between the back of the mirror element 14 and the front wall surface 28 of the back panel 12. To do this would require that the back panel 12 be formed of transparent plastic material, either clear or colored.

FIGURE 4 shows a rectangular back panel 12a similar to back panel 12, in which there is provided a rectangular continuous rib 62 to provide a corresponding continuous rectangular channel 40a.

FIGURE 5 illustrates the same mirror construction as described above with reference to that shown in FIGURES 1, 2 and 3. In this modification, the back panel 12b is circular and is formed with a circular frame 24b and a circular row of spaced arcuate ribs 32b, 33b, 34b and 35b to provide an annular channel 40b. The mirror element 14b is circular as also the bezel element 16b.

It is to be understood that the same mirror construction may be applied to mirrors of square, triangular, oval or any other desired shape.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. A mirror structure comprising:
    (a) a plastic transparent back panel having a flat front wall surface,
    (b) a continuous upstanding perimetral flange on the front wall surface thereof defining a recess,
    (c) a plurality of upstanding ribs on said front surface uniformly spaced from said perimetral flange defining a channel therebetween,
    (d) a mirror element seated in said recess between said upstanding ribs to be positioned and held thereby,
    (e) the back surface of said mirror element engaging said front wall surface,
    (f) a one piece bezel element U-shaped in cross section and complemental in shape to said channel comprising throughout its extent:
        (a') an outer long arm,
        (b') an inner short arm,
        (c') an arcuate bight portion connecting said arms,
        (d') a centrally positioned minute bead on the free terminal edge of the long arm,
        (e') said inner and outer arms and arcuate bight portion being of the same thickness,
    (g) the free end portion of said long arm extending into said channel with its bead engaging the bottom of the channel,
    (h) the free terminal end of said short arm engaging the edge portions of said mirror element,
    (i) said bezel element locking said mirror element in place by a weld of said bead to said channel bottom, and
    (j) the short and long arms being parallel and spaced apart forwardly of the free edges of said ribs with the arcuate bight portion of the bezel element in spaced relation to said rib free edges,
    (k) said bezel element by virtue of its U-shape cross section entirely encasing said upstanding ribs and completely and positively sealing the edge portions of the mirror element in relation to said back panel,
    (l) and a display sheet in said recess with its face engaging the front wall surface of said back panel and its back engaging the back of the mirror element.

References Cited

UNITED STATES PATENTS

| | | | |
|---|---|---|---|
| 3,039,217 | 6/1962 | Stefanakis | 40—152 |
| 3,097,443 | 7/1963 | Kellner | 40—152 |
| 3,150,457 | 9/1964 | Thieme | 40—152 |
| 3,171,886 | 3/1965 | Holt et al. | 350—67 |

DAVID SCHONBERG, *Primary Examiner.*

PAUL R. GILLIAM, *Assistant Examiner.*

U.S. Cl. X.R.

40—156